United States Patent
Curran et al.

(10) Patent No.: US 12,450,621 B2
(45) Date of Patent: *Oct. 21, 2025

(54) SYSTEM FOR IMPROVING DISTRIBUTED NETWORK DATA FLOW EFFICIENCY BY GENERATING INTERACTION LEADS

(71) Applicant: Truist Bank, Charlotte, NC (US)

(72) Inventors: Tara Marie Curran, Marietta, GA (US); Jennifer Joy Wilson, Milwaukee, WI (US)

(73) Assignee: TRUIST BANK, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,626

(22) Filed: May 28, 2024

(65) Prior Publication Data
US 2024/0311857 A1    Sep. 19, 2024

Related U.S. Application Data

(63) Continuation of application No. 17/808,149, filed on Jun. 22, 2022, now Pat. No. 12,033,171.

(51) Int. Cl.
*G06Q 30/0204*    (2023.01)
*G06Q 30/0201*    (2023.01)

(52) U.S. Cl.
CPC ..... *G06Q 30/0204* (2013.01); *G06Q 30/0201* (2013.01)

(58) Field of Classification Search
None
See application file for complete search history.

(56) References Cited

U.S. PATENT DOCUMENTS

| | | |
|---|---|---|
| 6,067,525 A | 5/2000 | Johnson |
| 8,606,695 B1 | 12/2013 | Arora |
| 10,565,602 B1 | 2/2020 | Ross |
| 2007/0027746 A1 | 2/2007 | Grabowich |
| 2008/0306848 A1 | 12/2008 | Bartholomew |
| 2009/0192918 A1 | 7/2009 | Hood |
| 2010/0063890 A1 | 3/2010 | Huckleby |
| 2012/0116926 A1 | 5/2012 | Canning |
| 2014/0180882 A1 | 6/2014 | Berger |
| 2015/0088607 A1 | 3/2015 | Georgoff |
| 2017/0330220 A1 | 11/2017 | Korada |
| 2022/0164776 A1 | 5/2022 | Sasson |
| 2023/0138753 A1 | 5/2023 | Riemer |

OTHER PUBLICATIONS

W. Yang, Y. Chen, Y.-C Chen and K.-C Yeh, "Intelligent Agent-Based Predict System with Cloud Computing for Enterprise Service Platform in IoT Environment," in IEEE Access, vol. 9, pp. 11843-11871, 2021. (Year:2021).

*Primary Examiner* — Stephanie Z Delich
(74) *Attorney, Agent, or Firm* — Michael A. Springs, Esq.; Shumaker, Loop & Kendrick, LLP; Patrick B. Horne (57) ABSTRACT

Systems, apparatuses, and methods that improve network data flow efficiency by generating interaction leads. In various embodiments, the system provides at least one database containing user data, which is searched to generate at least one active lead from the user data. The system provides at least one interaction lead based upon analysis of the at least one active lead. The at least one interaction lead is transmitted to an agent device.

20 Claims, 5 Drawing Sheets

| ≡ Unassigned Opps (214) | Viewing as: | | | | Branch View | ⌕ ◯ ♂▾ ◯ |
|---|---|---|---|---|---|---|

| 29 Critical | 185 Important | 0 Additional | 0 Conversations |
| --- | --- | --- | --- |
| | | | 0 Conversations |
| | | | 0 Conversations |

Important

| Date/Time | Date/Time ⇕ | Name ⇕ | Client Name ⇕ | Status ⇕ | Teammate Name ⇕ | Location Name ⇕ |
|---|---|---|---|---|---|---|
| N/A | Deposit Trigger | Business Account... | John doe | Not Started | System | W Central FI-G |
| N/A | Deposit Trigger | Business Account... | Sam Smith | Not Started | System | W Central FI-G |
| N/A | Deposit Trigger | Business Account... | Jane James | Not Started | System | W Central FI-G |
| N/A | Deposit Trigger | Deposit Signif... | Tom Tell | Not Started | System | W Central FI-G |
| N/A | Deposit Trigger | Retension Signi... | Sue Miller | Not Started | System | W Central FI-G |
| N/A | Deposit Trigger | Deposit Signif... | Pat Kline | Not Started | System | W Central FI-G |

Opportunity Details | Client Info | Related | Accounts | Notes

Deposit: Significant Deposit-Consumer

| | | |
|---|---|---|
| Type: | Deposit Trigger | Phone Numbers: |
| Assigned Location: | W Central Fl-Golden Triangle | C: |
| Assigned Teammate: | SYSTEM | H: N/A |
| Due Date: | N/A | W: N/A |
| Expiration Date: | April 7, 2022 | |
| Lead Number: | 15 | |
| Comments 500 characters | | |

Comments

[Left Message] [No Answer] [Answer] [Bad Contact Info] [OCCG in Last 7 Days]

Lead Description:
Deposit greater than $10K was made into a consumer checking, savings or money market account

| | | | |
|---|---|---|---|
| Trunorth Segment: | Core Mass | Presence Of Bill Pay... | Y |
| Account Flag: | R | Account Type: | SENIOR CHECKING-MM |
| 3 Month Average Acco... | 170.04 | Transaction Date: | 03/31/2022 |
| Lead ID: | A2b6a4fa1d2dd480eb | Last Conversation Date: | n/a |

[Save] [Cancel]

Consumer Mma Or Savi...: Y
Transaction Amount: 13222.26

Resources | Opportunity History | Supporting Tools

Value Statement
See Script
Script

FIG. 5

SYSTEM FOR IMPROVING DISTRIBUTED NETWORK DATA FLOW EFFICIENCY BY GENERATING INTERACTION LEADS

CROSS REFERENCE TO RELATED APPLICATIONS

This application is a continuation of and claims priority to co-pending U.S. patent application Ser. No. 17/808,149 filed Jun. 22, 2022, entitled SYSTEM FOR IMPROVING DISTRIBUTED NETWORK DATA FLOW EFFICIENCY BY GENERATING INTERACTION LEADS, the entirety of which is hereby expressly incorporated by reference.

FIELD

The invention relates generally to an enterprise system, and more particularly to an enterprise that improves distributed network data flow efficiency by generating interaction leads.

BACKGROUND

In response to increasing competition, entities, like service providers, have begun to adopt interaction and service techniques that have been successful in other fields. Marketing interaction services poses unique challenges, however. To begin with, most people do not shop for interaction services as they do for other products. Instead, an event occurs to cause a user to make a change or be open to a change. A limited number of major life events may cause the user to consider a change either by moving, death, formation of a family, or when a user becomes significantly dissatisfied. For these reasons large unfocused marketing of interaction services is usually not effective. Instead, marketing of interaction services must be targeted to those users inclined to make a change or open other accounts. In the past, accurately identifying users that are open to change and predicting when these events will occur has been difficult, if not impossible. Thus, there is a need for an improved system and method for predicting when users or potential users will be open to change or new financial products.

To anticipate the needs of the users and support targeted marketing, a service provider must know its users. Knowing the users is also important for improved user service and a long-understood way of obtaining and keeping new users. With the emergence of mobile applications for interaction services, however, it has become more difficult to develop relationships with the users because the frequency of in-person contact of the user with particular employees has decreased. A size of a large entity's user base can also present an obstacle to certain marketing efforts. In the financial community, the large entity may have several million households and users each with a unique set of accounts. The data available for these households, users, and accounts is so massive, that it has not been fully used for organized campaigns.

Certain entities traditionally maintain electronic user records in one or more user databases. A database management system (DBMS) may be employed to manage the creation, storage, access, updating, deletion, and use of the user databases. The DBMS creates databases and their structures, which may provide the means to: control and administration of the data in the databases; to access, enter, modify, and manipulate the data in a databases; "ad hoc" query facilities; report access of the database and activity performed; report hardware utilization, status of current users, and other monitoring data; and provide automatic backup and recovery routines for the data in databases. The database management system may allow the data to be readily created, maintained, manipulated, and retrieved from the databases.

In recent years, certain entities have used direct mailing and telemarketing to advertise a wide variety of financial products and services to existing and new users. To assist these efforts, the entities have used traditional databases containing, for example, user lists and mailing lists. These traditional marketing methods do not, however, take full advantage of the information available to the entities.

Today's entities typically tender consumers a wide variety of financial products, including traditional deposit, investment, loan, and mortgage accounts, as well as a variety of interaction services, including credit cards, brokerage, direct access, business access, checks as cash, telephone bill payment, and safety check. In addition, the entities typically tender access to interaction services through a variety of means, including mobile applications, automatic teller machines (ATMs), user activated terminals (CATs), personal computers, voice response systems, as well as traditional human bank tellers. Information from these diverse sources provides a comprehensive overview of a user's financial habits and needs. Thus, the ability to store and retrieve this wealth of data in a meaningful way has enormous commercial potential. Despite this commercial potential, there remains a need for a system and method for using the comprehensive information from these diverse sources and retrieving information from the databases in a meaningful and practical way.

There are several deficiencies in currently available systems and methods. Most users (e.g., bank employees) never learn how to use complex databases and have only a limited understanding of the program. Consequently, the current databases typically do not have the flexibility to allow the user, the person most familiar with marketing, to use their own knowledge and experience to select criteria retrieving data from the database for targeted marketing. Instead, users must rely on a set of pre-defined queries that may or may not provide the desired results. As a result, organized campaigns typically only target easily ascertainable groups of new or existing users, such as all new users, or all existing users with certain types of accounts, etc. Since there has been no effective way to quickly generate and distribute lists of leads for very specific groups of people that are most likely to subscribe to new interaction services being tendered, those users who most likely need or want the additional products the entity has to tender are not always the ones targeted by the organized campaigns. This has resulted in less than satisfactory success rates for the organized campaigns.

In addition, enterprise agents, for example bank branches, branch managers, and others in charge of the organized campaigns, are often not given access to a user's entire relationship with the entity or complete demographic information about the user (i.e., the user's "profile"). Thus, it is difficult for the agents to address the targeted users intelligently, with full knowledge of the user's background and financial situation. Basic information about existing users is frequently not available, or the response time required to profile an existing user is too long. These problems tend to create a poor experience for the user and less than optimum performance of the agents.

Moreover, the performance of the agent has not been analyzed and tracked effectively. A complete indication of performance has typically only been available after the organized campaigns are complete and after the results of the organized campaigns are manually collected and analyzed. This typically requires ad-hoc systems that generate relatively slow feedback to the agents.

Accordingly, it would be desirable to provide an improved integrated system for identifying targets, distributing leads, enhancing interaction tools, and tracking the performance of large organized campaigns and individual agents to maximize user satisfaction, as well as the profit of the entity.

BRIEF SUMMARY

In concordance and agreement with the present invention, an improved integrated system for identifying targets, distributing leads, enhancing interaction tools, and tracking the performance of large organized campaigns and individual agents to maximize user satisfaction, as well as the profit of the entity, has surprisingly been discovered.

In one embodiment, a system for improving distributed network data flow efficiency, comprises: a computer with one or more processor and memory, wherein the computer executes computer-readable instructions to guide interactions with an agent device; and a network connection operatively connecting the agent device to the computer; wherein, upon execution of the computer-readable instructions, the computer performs steps comprising: providing at least one database containing user data; generating at least one active lead from the user data; generating at least one interaction lead based upon analysis of the at least one active lead; and transmitting, via the network connection, the at least one interaction lead to at least one agent device.

In some embodiments, the at least one active lead comprises at least one deposit lead.

In some embodiments, the at least one active lead comprises at least one retention lead.

In some embodiments, the at least one active lead comprises at least one borrowing lead.

In some embodiments, the at least one interaction lead is displayed on an agent dashboard provided by the at least one agent device.

In some embodiments, the interaction lead is related to tendering a product and/or service.

In some embodiments, the at least one interaction lead is related to at least one of an organized campaign.

In some embodiments, the user data includes at least one of demographic data and transaction history data of at least one user.

In some embodiments, the computer performs steps further comprising comparing the at least one active lead to one or more selection criteria.

In some embodiments, the computer performs steps further comprising discarding the at least one active lead that does not satisfy the one or more selection criteria.

In some embodiments, the computer performs steps further comprising combining the at least one active lead with at least one list lead and/or at least one queued lead.

In some embodiments, the computer performs steps further comprising applying one or more guidelines to at least one active lead, list lead, and queued lead.

In some embodiments, the computer performs steps further comprising applying a predetermined limit for a number of the at least one interaction lead transmitted to the at least one agent device.

In another embodiment, a method of improving distributed network data flow efficiency, comprises the steps of: providing at least one database containing user data, at least one processor in communication with the at least one database, a memory device including readable instructions, and at least one agent device in communication with the at least one processor via a network connection; generating, via the at least one processor, at least one active lead from the user data; generating, via the at least one processor, at least one interaction lead based upon analysis of the at least one active lead; and transmitting, via the network connection, the at least one interaction lead to the at least one agent device.

In some embodiments, the method further comprises the step of comparing the at least one active lead to one or more selection criteria.

In some embodiments, the method further comprises the step of discarding the at least one active lead that does not satisfy the one or more selection criteria.

In some embodiments, the method further comprises the step of combining the at least one active lead with at least one list lead and/or at least one queued lead.

In some embodiments, the method further comprises the step of applying one or more guidelines to at least one active lead, list lead, and queued lead.

In some embodiments, the method further comprises the step of applying a predetermined limit for a number of the at least one interaction lead transmitted to the at least one agent device.

In some embodiments, the user data includes at least one of demographic data and transaction history data of at least one user.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein.

DETAILED DESCRIPTION

Embodiments of the present disclosure will now be described more fully hereinafter with reference to the accompanying drawings, in which some, but not all, embodiments are shown. Indeed, the presently disclosed subject matter may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the subject matter and enable one of ordinary skill in the art to make, use, and practice the subject matter.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present disclosure described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the subject matter. Therefore, it is to be understood that, within the scope of the included claims, the presently described subject matter may be practiced other than as specifically described herein.

Figure 1:
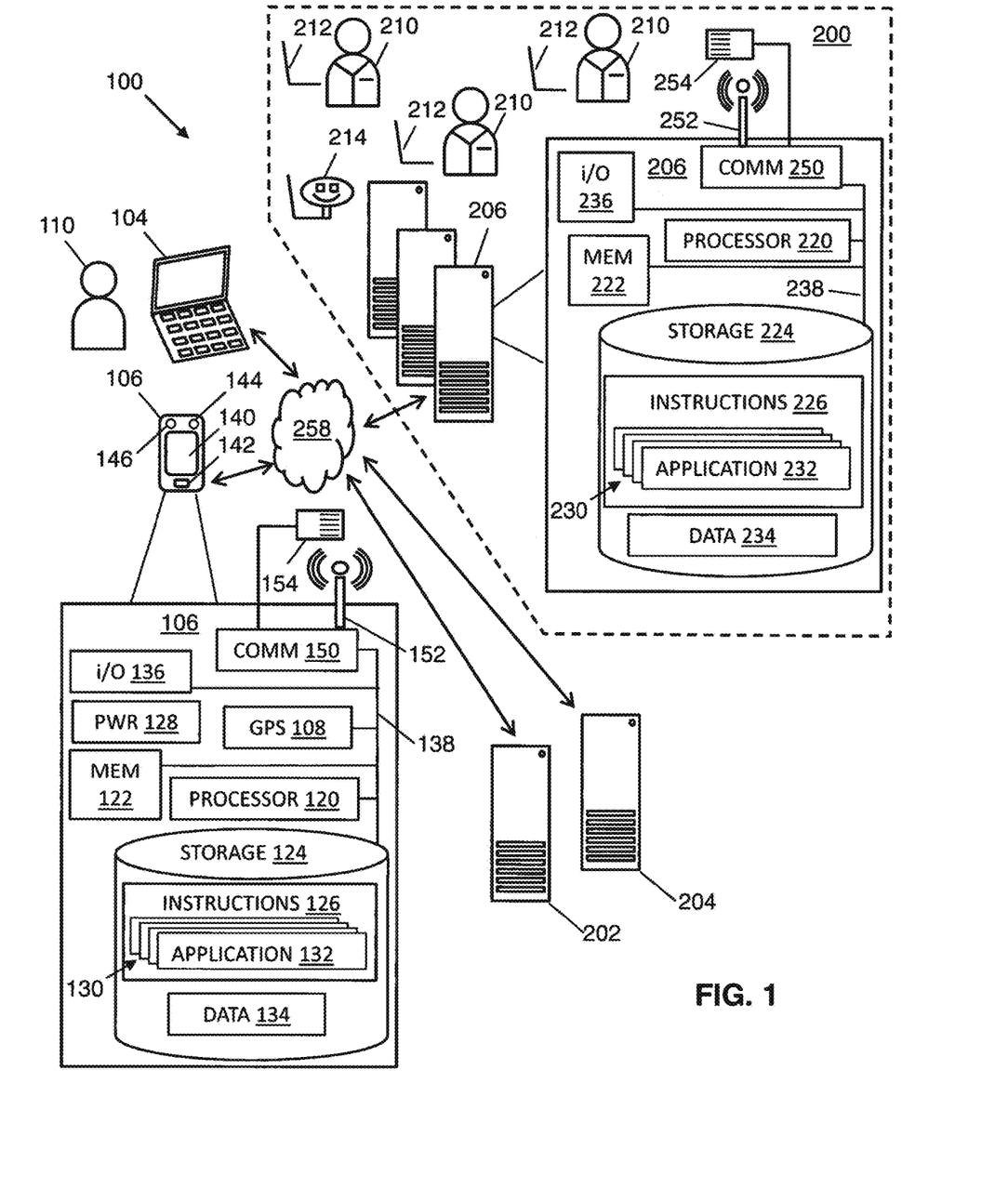
FIG. 1 is a schematic diagram illustrating an enterprise system and environment thereof for implementing a user interaction application, in accordance with an embodiment of the presently described subject matter.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, users, business entities, government entities, clubs, and groups of any size are all within the scope of these descriptions.

The user device, as illustrated with reference to the mobile device 106, includes components such as, at least one of each of a processor or processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application capable of performing the same or similar tasks to the mobile banking system client application. As used hereinafter, each of the software application associated with the enterprise system 200 and the analogous web browser application capable of performing the same or similar tasks are denoted by reference numeral 132, which may refer to a mobile banking system client application capable of operating on either of the user devices 104, 106.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122. For example, the processing device 120 may be capable of operating a connectivity program, such as the previously described web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like. The application 132 related to the enterprise system 200 may be configured to operate in similar fashion for transmitting such web content.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can tender any number or type of services and products to one or more users 110. In some examples, an enterprise system 200 tenders products. In some examples, an enterprise system 200 tenders services. Use of "service(s)" or "product(s)" thus relates to either or both in these descriptions. With regard, for example, to online information and interaction services, "service" and "product" are sometimes termed interchangeably. In non-limiting examples, services and products include retail services and products, information services and products, custom services and products, predefined or pre-tendered services and products, consulting services and products, advising services and products, forecasting services and products, internet products and services, social media, and interaction services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of service (POS) representatives, online user service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at user service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications tendering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processor or processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can also store a database 262 (depicted in FIG. 3) of various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts or diagrams expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, users, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
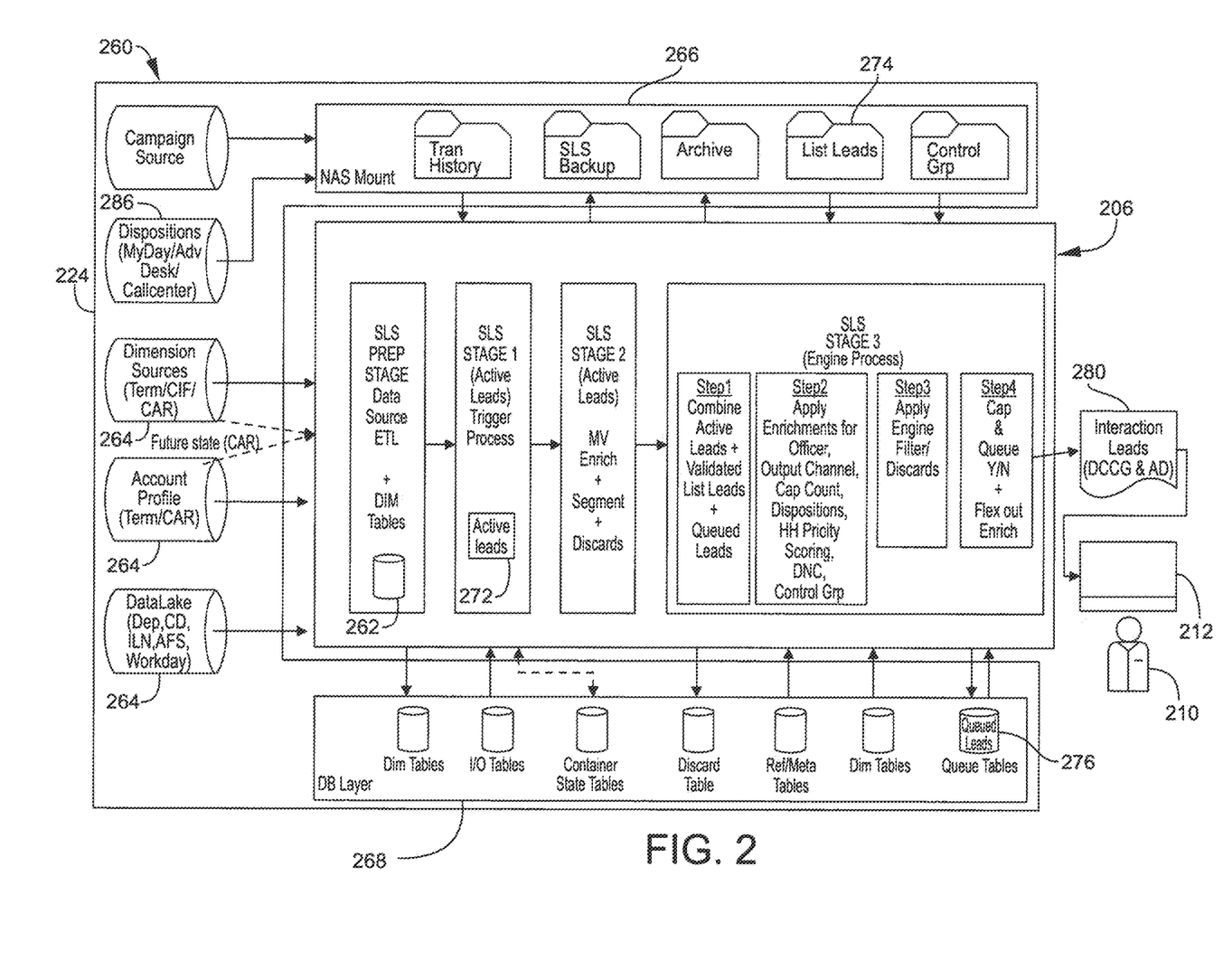
FIG. 2 is a flow diagram showing a high-level architecture of a user interaction application according to an embodiment of the presently disclosed subject matter.

One of the programs 230 of the enterprise system 200 may be a user interaction application 260, a preferred architecture of which is shown in further detail in FIG. 2. The application 260 may be used by an entity to improve interactions with the users 110 and performance of the human agents 210.

As used in the following description, a "lead" is a user or non-user specifically targeted for interaction efforts based upon a probable need. The lead can be self-identified, part of an ongoing effort, or part of a short term organized campaign. A "campaign" is a group of targeted leads (user or non-user) that are managed through the application 260 to introduce or expand new or existing products and services tendered by the entity.

A "session" as used herein is a meeting, typically by telephone, between the human agents 210 and the users 110 that results in the tendering of products or services to the users 110 and/or other members of the household of the users 110. Sessions are used to meet with the users 110, to discuss the management needs of the users 110, and to tender products and services to satisfy the needs of the users 110.

The application 260 utilizes the components of the enterprise system 200 to provide a systematic way of targeting the users, generating lead lists, and tracking a success of user solicitations. In this way, the leads may be automatically uploaded overnight and transmitted to the human agents 210, for example, the POS representatives. The application 260 may be capable of interfacing and in communication with other programs 230 and applications 232 of the enterprise system 200 such as programs 230 and/or applications 232 for providing various products and services of the entity, for example. Preferably, those programs 230 and/or applications 232 associated with opening accounts, commencing mortgages, and the like, for example.

The application 260 utilizes the computing system 206 of the enterprise system 200 including, but not limited to, the processor 220, the memory 222, the database 262 of data 234 stored in the storage device 224, and a plurality of the agent devices 212. These components may be "geographically separated" or "geographically remote" from one another and in communication through the system interconnect 238, the communication interface 250, and/or other means so that each of the components may be permitted to communicate electronically with one another. As used throughout this application, the terms "geographically separated" and "geographically remote" are intended to refer to a significant spatial separation such as locations in different cities or states and is not intended to refer to adjacent rooms or floors of a building. In connection with the preferred embodiment, the "geographically separated" and "geographically remote" systems are maintained in different regions of the country. In this manner, the application 260 has the capability to be accessed by the human agents 210 from any remote location using the agent devices 212.

Figure 3:
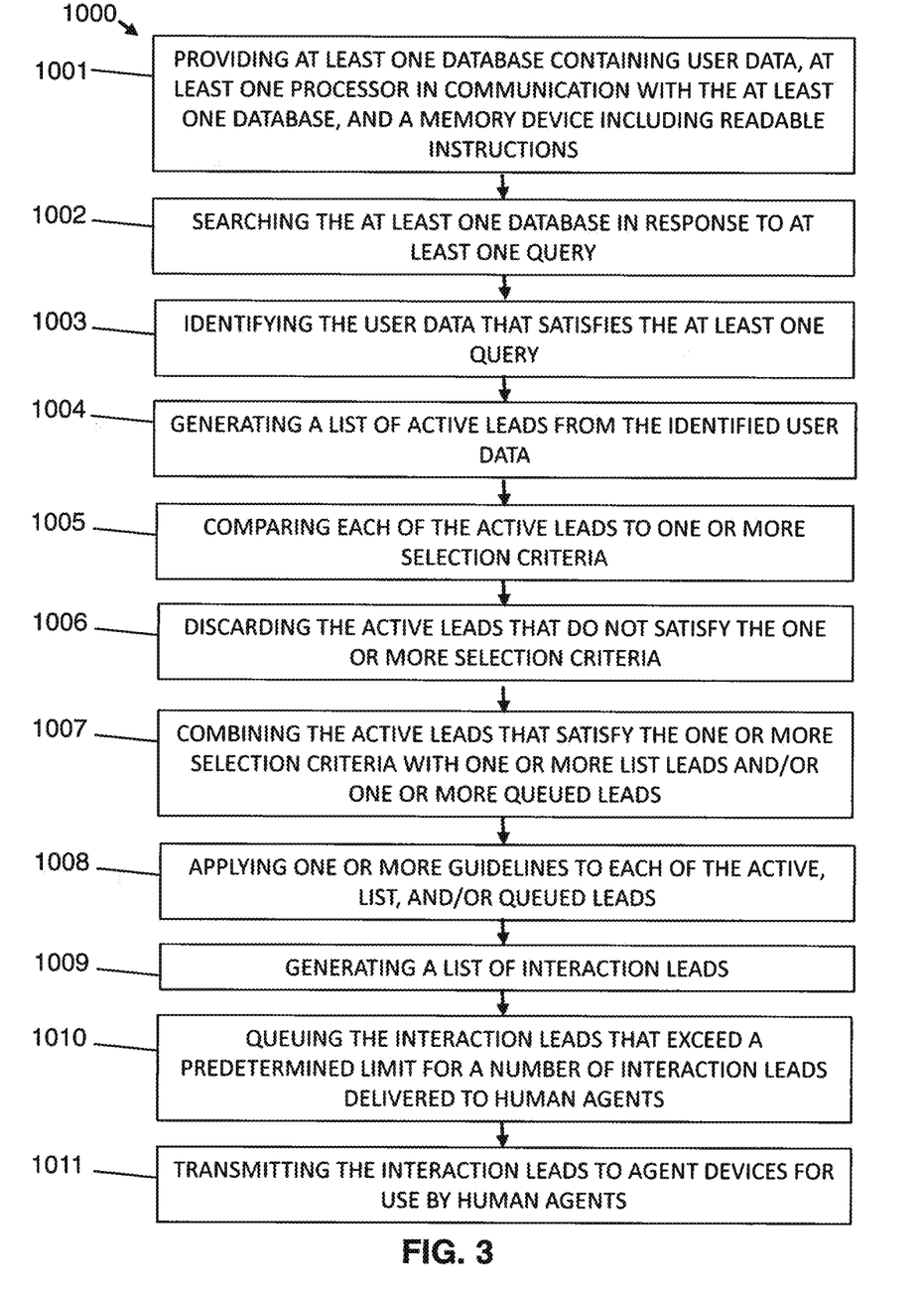
FIG. 3 is a flow chart representing a method, according to at least one embodiment, of improving distributed network data flow efficiency by identifying and distributing interaction leads, enhancing interaction tools, and tracking the performance of campaigns and individual agents to maximize user satisfaction.

FIG. 3 illustrates a method 1000 of implementing the application 260 for improving interactions with the users 110 and performance of the human agents 210 according to the present invention. The method includes an initial step 1001 of providing data 234 of the users 110 in the database 262. In some embodiments, the data 234 of the user 110 may be created by querying a single user 110 or a plurality of the users 110 for attaining one or more responses forming response data entries. The querying may be conducted directly by the enterprise system 200 or by a third party external source 202, 204, and may be initiated at the request of the user 110 via participation in a campaign, the enterprise system 200 via a corresponding communication or request, or the third party external source 202, 204.

The database 262 captures data 234 from various sources at various times including, for example, daily and monthly feeds from other programs 230, applications 232, and systems 202, 204. The database 262 may be designed to insure accuracy of the data 234 in a uniform format. Thus, the application 260 may include one or more instructions and/or algorithms for scrubbing and standardizing the data 234 (i.e. incoming information, data history, designating status codes, maintaining tables, etc.). For example, one algorithm of the application 260 may link different accounts together into a single unit considered to be one household, based on information such as the same last name and address, or same name or social security number on different accounts, and so forth that indicate the same user 110 or users 110 living in the same household. Accordingly, the application 260 includes instructions and/or algorithms that facilitate access to the data 234 in the database 262 and permit extracting the data 234 logically and use thereof in a meaningful way.

The database 262 may receive the data 234 that originates from a plurality of information sources such as internal sources 264, internal files 266, and tables 268 of the enterprise system 200, as well as external sources such as the system 100 and/or the external systems 202, 204. As shown, the internal sources 264 may include dimension sources, account profiles, transactional information, and the like, etc.; the internal files 266 may include the data 234 from campaign sources and lead dispositions 286 such as transaction history, backup files, archives, list leads generated from one or more campaigns, control group files, and the like, etc.; and the tables 268 may be lookup tables and include dim tables having source data (i.e. a listing of the control group), input/output tables, container state tables having transactional details of users 110, discard tables maintaining discarded leads, reference/meta tables containing parameters (i.e. thresholds and rankings) used to apply lead restrictions, and queue tables containing queued leads, and the like, etc.

The purpose of the database 262 is to be a single repository of information that may be accessed during one or more queries conducted by the application 260. The database 262 may include the data 234 associated with a plurality users 110 of the system 100. As mentioned hereinabove, each of the users 110 may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary data regarding each of the participating users 110 for making the determination described hereinafter. The relationship present between the enterprise system 200 and each of the users 110 may include one or more of the users 110 having an account with the enterprise system 200 wherein certain interactions between the enterprise system 200 and each of the users 220 may be monitored and recorded by the computing system 206. Alternatively, if not already customers or clients, one or more the users 110 may be representative of persons or entities that are considered to be potential or prospective customers or clients, such as those persons or entities for which the computing system 206 has the necessary data allowing for the enterprise system 200 to identify and then communicate with the corresponding person or entity to tender products and/or services.

In some embodiments, the present disclosure may be carried out with respect to the users 110 having an established account with the enterprise system 200, wherein the establishment of an account may include the user 110 providing at least some of the entries of the associated data 234 to the enterprise system 200. The enterprise system 200 may collect the data 234 regarding the user 110 by directly querying and recording the responses of the user 110. Such data 234 may be entered via use of the web browser application or software application 132 associated with the system 100, and such information may be entered by the user 110 via use of the user devices 104, 106 executing the corresponding application 132. The data 234 provided to the enterprise system 200 regarding the users 110 may include, as non-limiting examples, the gender, age, income level, employment status, home ownership status, marital status, citizenship status, etc. of the corresponding users 110. Any available demographic data regarding the users 110 may form a portion of the data 234 utilized by the application 260 with respect the users 110.

If the enterprise system 200 is representative of a financial institution or mobile banking system, the data 234 accessible to the enterprise system 200 regarding the user 100 may include data regarding products and/or services tendered to the users 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data 234 may further include files such as those for user accounts, user profiles, user account balances, user transaction histories, user investment portfolios, past communications with the users 110, or files downloaded or received from other devices such as the user devices 104, 106 of the users 110.

In some circumstances, such as when the enterprise system 200 is representative of a financial institution or mobile banking system offering typical banking services and products, the enterprise system 200 may have access to the data 234 regarding the transactions of the users 110 as facilitated by the enterprise system 200. For example, transaction histories regarding purchases carried out via a credit card or debit card associated with the enterprise system 200 may be accessible to the computing system 206, as well as current or prior account balances or statuses of such accounts.

The enterprise system 200 may also be configured to monitor and record specific interactions of the users 110 with the enterprise system 200 in attaining additional data 234 regarding the users 110 that may be utilized by the application 260 disclosed herein. For example, in the event that one or more of the users 110 has an account with the enterprise system 200, the users 110 may be required to provide authentication data to the web browser application or software application 132 associated with the system 100. Following such a login process, the enterprise system 200 may monitor and record the interactions of the identified users 110 with the interface of the corresponding application 132 in order to accumulate the data 234 associated with the users 110. For example, the enterprise system 200 may monitor the data 234 such as the number of logins to the account of the users 110 in a specified period of time, the frequency of the logins of the users 110, the duration of time the user 110 remains logged into the application 132 (while remaining active), and the types of products and/or services interacted with and/or purchased by the users 110 via navigation of the corresponding application 132. The data 234 may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the users 110.

The data 234 regarding the users 110 may also include data relating to the account settings of the users 110 as established with respect to the computing system 206. Such data 234 may be stored in the storage device 224 of the computing system 206 and may be associated with determining how the computing system 206 interacts with the users 110 via the corresponding user devices 104, 106. For example, such data 234 may include data relating to the frequency of communications sent from the computing system 206 to the users 110 for access via the user devices 104, 106, under what conditions to communicate with the users 110, the content of such communications, the types or forms of such communications, the manner in which the interface of the web browser application or software application 132 displays information to the users 110, or the information or resources accessible to the users 110 via navigation of the web browser application or software application 132, as non-limiting examples.

In other circumstances, the data 234 may be representative of data acquired regarding the users 110 during web related activities, such as tracking a web browsing history of the users 110, as may be provided by "cookies" or similar tools, or tracking certain communications of the users 110, such as monitoring certain aspects of the email activity of the users 110. If web related activities are monitored, such data 234 may correspond to the activities of the users 110 with respect to the webpage or software application 132 associated with the system 100 or may relate to the activities of the users 110 with respect to third party applications or websites. Such data 234 may be communicated from the corresponding user devices 104, 106 used to perform the web browsing to the computing system 206 for storage in the database 262 as a form of the data 234.

The enterprise system 200 may also utilize the data 234 originating from one of the external systems 202, 204, which may be representative of data accumulated with respect to the users 110 external to the enterprise system 200 that is available to or otherwise accessible by the computing system 206 via interaction with one or more of the external systems 202, 204. The external systems 202, 204 may accordingly be representative of third-party data providers configured to communicate data 234 to the computing system 206 regarding the users 110. Such data 234 may include a credit history of the users 110 or transactions of the users 110 with respect to other business entities, as may originate from sources others than the enterprise system 200. Further examples include data 234 originating from third party social networks or the like, such as check-ins at certain establishments, social connections to other users, posting or commenting histories, or interactions with certain other users or business entities. Data 234 regarding a transaction history of the users 110, whether derived from the relationship between the users 110 and the enterprise system 200 or the users 110 and the external system 202, 204, may include data 234 regarding the establishments at which the users 110 have made the purchases, the amounts of such purchases, and potentially additional information regarding the products and/or services related to such purchases. Such data 234 may be available via records of the credit or debit purchases made by the users 110 with respect to certain establishments as monitored by the external system 202, 204.

The data 234 collected with respect to each of the users 110 may be categorized as demographic data regarding the users 110, behavioral data regarding the activities of the users 110, or behavioral data regarding the activities of the enterprise system 200 with respect to the users 110. The behavioral data 234 regarding the activities of the enterprise system 200 with respect to the users 110 may include data 234 relating to past communications from the enterprise system 200 to the users 110 regarding educational materials or data 234 relating to tenders for the purchase of products and/or services. The demographic data generally refers to the data 234 regarding the users 110 that corresponds to a trait or characteristic of the users 110 by which the users 110 may be categorized or classified, whereas the behavioral data 234 generally refers to the data 234 regarding the recordation of information regarding the actions of the users 110, the actions of the enterprise system 200, or past interactions or transactions occurring between the enterprise system 200 and the users 110.

The data 234 associated with any individual user 110 may include entries of any of the different types of data 234 disclosed hereinabove, including entries relating to demographic data 234 or behavioral data 234. Each entry of the data 234 may be representative of one of the demographic traits of the user 110 or one of the behavioral traits of the user 110. The number or types of entries available in the data 234 may vary among users 110 depending on the relationship to the enterprise system 200 and the availability of such data 234. Some entries of the data 234 of some users 110 may accordingly be empty or may include assumed or predicted data 234, as desired.

As used in various examples hereinafter, the data 234 of at least one of the users 110 may include at least one data entry related to a past purchase or an ongoing use (active status) of a product and/or service by the corresponding user 110 as tendered by the enterprise system 200, or to the lack of the purchase or use of such a product and/or service by the corresponding user 110. The data 234 of at least one of the users 110 may also include at least one data entry related to the frequency of use or manner of use of a certain product and/or service provided by the enterprise system 200 for use by the corresponding user 110. The product and/or service for which the frequency or classification of use is collected may correspond to the previously mentioned product and/or service for which the data 234 regarding the past purchase or ongoing use is collected. For example, if the corresponding user 110 has an established credit card account with the enterprise system 200, the data 234 associated with the corresponding user 110 may include a data entry relating to the active status of the credit card account (thereby indicating the past purchase or ongoing use thereof), a data entry relating to the frequency of use of the credit card account, and at least one data entry relating to the types or amounts of the transactions carried out with the credit card account. The data 234 of the corresponding user 110 may also include data entries relating to the lack of purchase and/or use of other products and/or services also provided by the enterprise system 200, such as alternative financial products and/or services that the user 110 is not currently utilizing. The data 234 of the corresponding user 110 may also, where applicable, include data entries relating to the purchase and/or use of products and/or services provided by a third-party entity, such as entities representative of competitors to the enterprise system 200. For example, the data 234 may include data entries that indicate the presence of other credit card accounts associated with the corresponding user 110 with respect to third-party financial institutions and any available data regarding the frequency or manner of use of such third-party credit card accounts. As evidenced by the examples set forth hereinafter, it should be appreciated that the data 234 associated with each of the users 110 may include any combination of the data 234 described as being available to the computing system 206 herein while remaining within the scope of the present disclosure.

The presently described subject matter relates to the application 260 carried out by the computing system 206 of the enterprise system 200 and suitable for providing interaction leads 280 based on the data 234 at the time of the query. The data 234 utilized in performing the application 260 may comprise any subset of the described types of data 234 described herein with respect to the users 110. The data 234 may include the use of all entries of the data 234 associated with each of the users 110 or may include the use of only specific data 234 associated with each of the users 110, such as only certain demographic data or certain data relating to the purchase and/or use of certain products and/or services tendered by the enterprise system 200. The data 234 may be limited to the data 234 of only those users 110 having a specific classification based on an analysis of the data 234 of each of the users 110 for which the enterprise system 200 has the necessary data 234. For example, the data 234 may be limited to only those users 110 having an active account with the enterprise system 200, only those users 110 fitting into a specific demographic classification such as exceeding a certain age, only those users 110 that have already purchased or are currently utilizing a selected product and/or service offered by the enterprise system 200, or only those users 110 that have not already purchased or utilized a selected product and/or service tendered by the enterprise system 200. The data 234 may also include each of the data entries described as relating to the purchase and/or ongoing use of a particular product and/or service being limited to those activities having occurred within a given time frame, such as those data entries representative of activity having occurred within the past month, the past 6 months, the past year, or the like.

In step 1002, the application 260 may continuously or periodically access and/or search the database 262 that includes the data 234 in response to at least one query. As a non-limiting example, the application 260 accesses and/or searches the database 262 after operations have ceased on one business day and prior to commencement of operations the next business day. A variety of different triggering conditions 270 of the query may be utilized by the application 260 when searching the data 234 contained in the database 262. In step 1003, the data 234 that satisfies the at least one query is identified and, in step 1004, a list of active leads 272 for further processing by the application 260 is generated. It is understood that the list of active leads 272 may be generated automatically by the application 260, semi-automatically by the human agents 210 using the application 260, or manually by the human agents 210 alone, if desired. It is further understood that the list of active leads 272 may be generated by the application 260 and/or the human agents 210 at any desired time such as continuously or periodically, for example. In one embodiment, the list of active leads 272 may be automatically generated by the application 260 on a daily basis.

In some embodiments, the application 260 extracts a list of all households of the users 110, users 110, or accounts that meet the triggering conditions 270 based on demographics, account balances, products, ownership, and so forth, for one or more targeted actions such as tendering new products and/or services, for example. For example, the triggering conditions 270 may generate one or more active leads 272 when a transaction meeting specific qualifications occurs, a pattern of eligible transaction behavior occurs, and/or a transaction that is outside a normal pattern of behavior occurs. In certain embodiments, one or more of the triggering conditions 27 may be further defined by one or more predetermined parameters. Each of the predetermined parameters may be a maximum, a minimum, or a range of values and may correspond to an amount, a percentage, a frequency, a particular date, and/or a duration of time. As discussed herein, the one or more predetermined parameters may be defined in one or more of the tables 268 used by the application 260.

In certain embodiments, the active leads 272 generated by the triggering conditions 270 of the application 260 may comprise deposit leads, retention leads, and borrowing leads. The deposit leads may be generally triggered by a deposit that warrants contact of the users 110 because the deposit falls below, meets, or exceeds one or more predetermined parameters and/or a change in a pattern of deposit behavior of the user 110 (i.e. increase in frequency of deposits, etc.) occurs. For example, the triggering conditions 270 generate a new active lead 272 when a single deposit exceeds a predetermined amount into a checking, savings, and/or money market account of one of the users 110.

The retention leads may be generally triggered by a withdrawal that warrants contact of the users 110 because the withdrawal falls below, meets, or exceeds one or more predetermined parameters and/or a change in a pattern of withdrawal behavior of the user 110 (i.e. the pattern of withdrawal behavior indicates that the user 110 may be dissatisfied with the products and/or services) occurs. For example, the triggering conditions 270 generate a new active lead 272 when one or more withdrawals from an account of the user 110 occurring over one or more days exceeds a predetermined percentage and/or a predetermined amount over a predetermined duration of time.

The borrowing leads may be generally triggered by a payoff of a loan that falls below, meets, or exceeds one or more predetermined parameters. For example, the triggering conditions 270 generate a new active lead 272 when the user 110 pays off a loan earlier than a predetermined number of days prior to the maturity date. It should be appreciated that the predetermined parameters used for each of the deposit leads, retention leads, and the borrowing leads may be based upon whether the user 110 is a consumer, a business entity, a government entity, a club, or a group and/or a size thereof.

After the query is ran against the database 262, in step 1005, each of the active leads 272 resulting from the search is compared, via the processor 220, to one or more selection criteria. The selection criteria may be defined in one or more of the tables 268 used by the application 260. In certain embodiments, the application 260 in step 1006 uses the one or more selection criteria to discard or remove from the list of the active leads 272 those leads that do not satisfy requirements necessary for further processing by the application 260. The one or more selection criteria may be, for example, the active lead 272 includes invalid account information, the active lead 272 is associated with an ineligible cost center and/or officer, the active lead 272 does not meet segmentation guidelines, the active lead 272 does not meet predetermined parameters for users 110 in officer-assigned relationships, and/or the active lead 272 is associated with an internal transfer within same household.

Once the active leads 272 are filtered using the one or more selection criteria, the active leads 272 that satisfy the selection criteria may be combined with one or more list leads 274 and/or one or more queued leads 276 in step 1007. In some embodiments, the list leads 274 may be generated by various means, including but not limited to, developed on an ad-hoc basis, originating from ongoing list leads, and/or provided by call files created from one or more campaigns, for example. The ad-hoc list leads may comprise direct mail or email follow-up call leads and/or standalone leads targeting a particular group of users 110 that satisfy certain requirements, whereas the ongoing list leads may comprise new checking account onboarding leads, maturing certificate of deposit leads, and/or book of business leads, for example. In certain embodiments, the one or more queued leads 276 may be the interaction leads 280 provided to the human agents 210, via the agent devices 212 that remained unaddressed after a predetermined duration of time. The queued leads 276 may be stored in and obtained from the tables 268 in the storage device 224.

After the active leads 272, the list leads 274, and/or the queued leads 276 are combined, the application 260, in step 1008, applies one or more guidelines, via the processor 220, to each of the leads 272, 274, 276. When the leads 272, 274, 276 are combined, the application 260 is configured to compare each of the leads 272, 274, 276 with one another to identify and discard any duplicates. The one or more guidelines may be used to filter, sort, and/or prioritize the leads 272, 274, 276 in order to militate against "over-contacting" of the users 110, manage a number of each type of the leads 242, 274, 276 delivered the human agents 210, and/or prioritize delivery of the leads 272, 274, 276 with greatest potential.

In some embodiments, the one or more guidelines may comprise recent contact restrictions which militate against delivery of any, if not all, of the leads 272, 274, 276 when the household of the users 110 has been recently contacted according to the lead dispositions 286 located in the internal files 266. It is understood that the recent contact restrictions and/or a duration of such restrictions may vary for each of the leads 272, 274, 276. The recent contact restrictions and/or the duration of such restrictions may be stored in and obtained from the tables 268 in the storage device 224.

The one or more guidelines may also comprise a predetermined limit for the number of the active leads 272, the list leads 274, and/or the queued leads 276 delivered to the human agents 210. In certain embodiments, the predetermined limit may vary depending on a type of the human agents 210 receiving the leads 272, 274, 276. For example, the predetermined limit for the number of the active leads 272, the list leads 274, and/or the queued leads 276 delivered to the POS representatives and/or sales team members may be higher than the predetermined limit for the number of the active leads 272, the list leads 274, and/or the queued leads 276 delivered to managers and/or officers of the entity. In other embodiments, the predetermined limit may vary depending on the type of the leads 272, 274, 276 themselves. For example, the predetermined limit for the number of the active leads 272 delivered to the human agents 210 may be lower than the predetermined limit for the number of the list leads 274 and/or the queued leads 276 delivered thereto. It is further understood that at least one of the leads 272, 274, 276 may have no predetermined limit for the number thereof delivered to the human agents 210. The predetermined limit for the number of leads 272, 274, 276 may be stored in and obtained from the tables 268 in the storage device 224.

The one or more guidelines may further comprise a predetermined duration (i.e. an expiration date) for the active leads 272, the list leads 274, and/or the queued leads 276 delivered to the human agents 210. In certain embodiments, the predetermined duration may vary depending on a type of the human agents 210 receiving the leads 272, 274, 276. For example, the predetermined duration for the active leads 272, the list leads 274, and/or the queued leads 276 delivered to the POS representatives and/or the sales team members may be longer than the predetermined duration for the active leads 272, the list leads 274, and/or the queued leads 276 delivered to the managers and/or the officers of the entity. In other embodiments, the predetermined duration may vary depending on the type of the leads 272, 274, 276 themselves. For example, the predetermined duration for the active leads 272 delivered to the human agents 210 may be shorter than the predetermined duration for the list leads 274 and/or the queued leads 276 delivered thereto. It is further understood that at least one of the leads 272, 274, 276 delivered to the human agents 210 may have no predetermined duration. It is also understood that the predetermined duration for the active leads 272, the list leads 274, and/or the queued leads 276 may be determined based upon local, state, and federal laws and regulations such as the federal "Do Not Call" regulations, for example. The predetermined duration for the leads 272, 274, 276 may be stored in and obtained from the tables 268 in the storage device 224.

The one or more guidelines may further comprise an assignment of a priority score for each of the active leads 272, the list leads 274, and/or the queued leads 276 to be delivered to the human agents 210. In some embodiments, the priority score is based upon lead hierarchy and profitability of the household. For example, the priority score may be used for selecting the leads 272, 274, 276 to be delivered when there is more than one triggered lead per household and/or when the predetermined limit for any one of the leads 272, 274, 276 has been reached. In certain embodiments, the priority score may vary depending on a type of the human agents 210 receiving the leads 272, 274, 276. For example, the priority score for the active leads 272, the list leads 274, and/or the queued leads 276 delivered to the POS representatives and/or the sales team members may be higher than the priority score for the active leads 272, the list leads 274, and/or the queued leads 276 delivered to the managers and/or the officers of the entity. In other embodiments, the priority score may vary depending on the type of the leads 272, 274, 276 themselves. For example, the priority score for the active leads 272 delivered to the human agents 210 may be higher than the priority score for the list leads 274, but lower than the priority score for the queued leads 276 delivered thereto. It is understood that the priority score for the active leads 272, the list leads 274, and/or the queued leads 276 may be stored in and obtained from the tables 268 in the storage device 224.

The one or more guidelines may yet further comprise "Do Not Call" opt-out and/or control group exclusions. In some embodiments, any of the leads 272, 274, 276 associated with the users 110 included on the "Do Not Call" opt-out and/or control group exclusions is removed from the list of the leads 272, 274, 276 delivered to the human agents 210. It should be appreciated that the users 110 themselves may elect at any time to be included in the "Do Not Call" opt-out. The "Do Not Call" opt-out allows the entity to flag or otherwise identify those users 110 who have requested not to be contacted. Once the users 110 are identified, the suppression flag may become part of the generation process for the interaction leads 280 to insure that these users 110 are not contacted.

In certain embodiments, the control group exclusions may be determined by the entity using the application 260. For example, the persons at the entity responsible for overseeing the campaigns may select the users 110 to be included in the control group exclusions in order to assist with evaluating an effectiveness and efficiency of the campaigns. The control group may provide a baseline for comparison with actual results from use of the application 260 to tender products and/or services to the users 110.

Once the one or more guidelines have been applied by the application 260 and the computing system 206, the leads 272, 274, 276, in step 1009, are sorted and prioritized to generate the list of interaction leads 280. Subsequently, in step 1010, the list of interaction leads 280 may be compared to the predetermined limits for the number of the interaction leads 180 that may be delivered to the human agents 210. The interaction leads 280 that "overflow" or exceed the predetermined limits are then removed from the list of the interaction leads 280. Such "overflow" interaction leads 280 may then be identified as and included in the queued leads 276 stored in and obtained from the tables 268 in the storage device 224 during the query of the application 260. Thereafter, in step 1011, the list of interaction leads 280 may be transmitted from the computing system 206 to the agent devices 212 for use by the human agents 210. Each of the interaction leads 280 may be assigned by the application 260 to one of the human agents 210 most qualified to handle the interaction lead 280, or based on a workload and availability of the human agents 210.

In some embodiments, the interaction leads 280 may be divided amongst various distribution channels. In one preferred embodiments, the interaction leads 280 may be divided and transmitted via a first distribution channel to the human agents 210 located at branches, contact centers, and/or part of a direct team, and via a second distribution channel to the human agents 210 that are wealth advisors and premier bankers. In other embodiments, the interaction leads 280 may also be transmitted to an automated call center, if desired.

Figure 4:
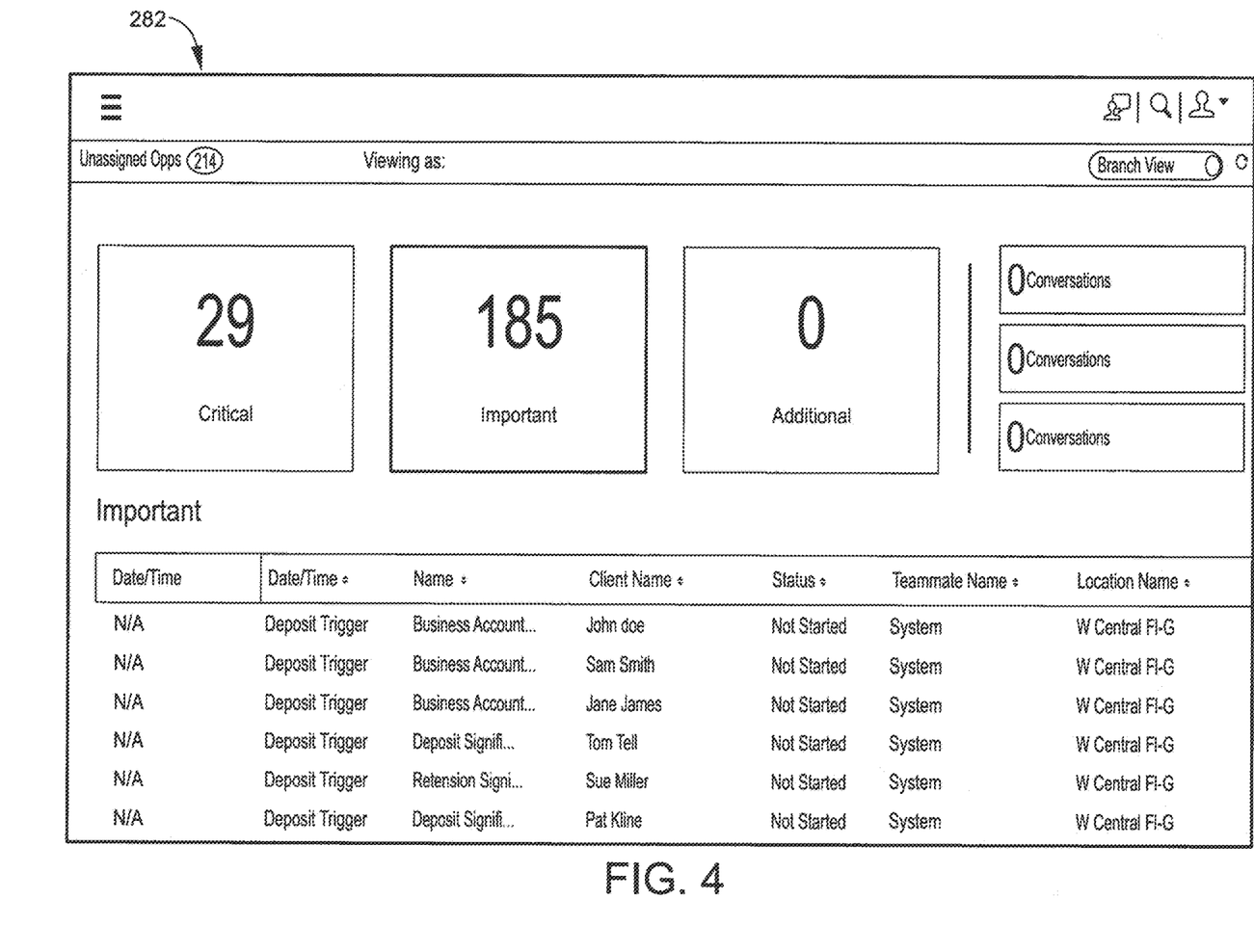
FIG. 4 is a representation of a graphical user interface displaying an agent dashboard including interaction leads generated by the enterprise system of FIG. 1.
Figure 5:
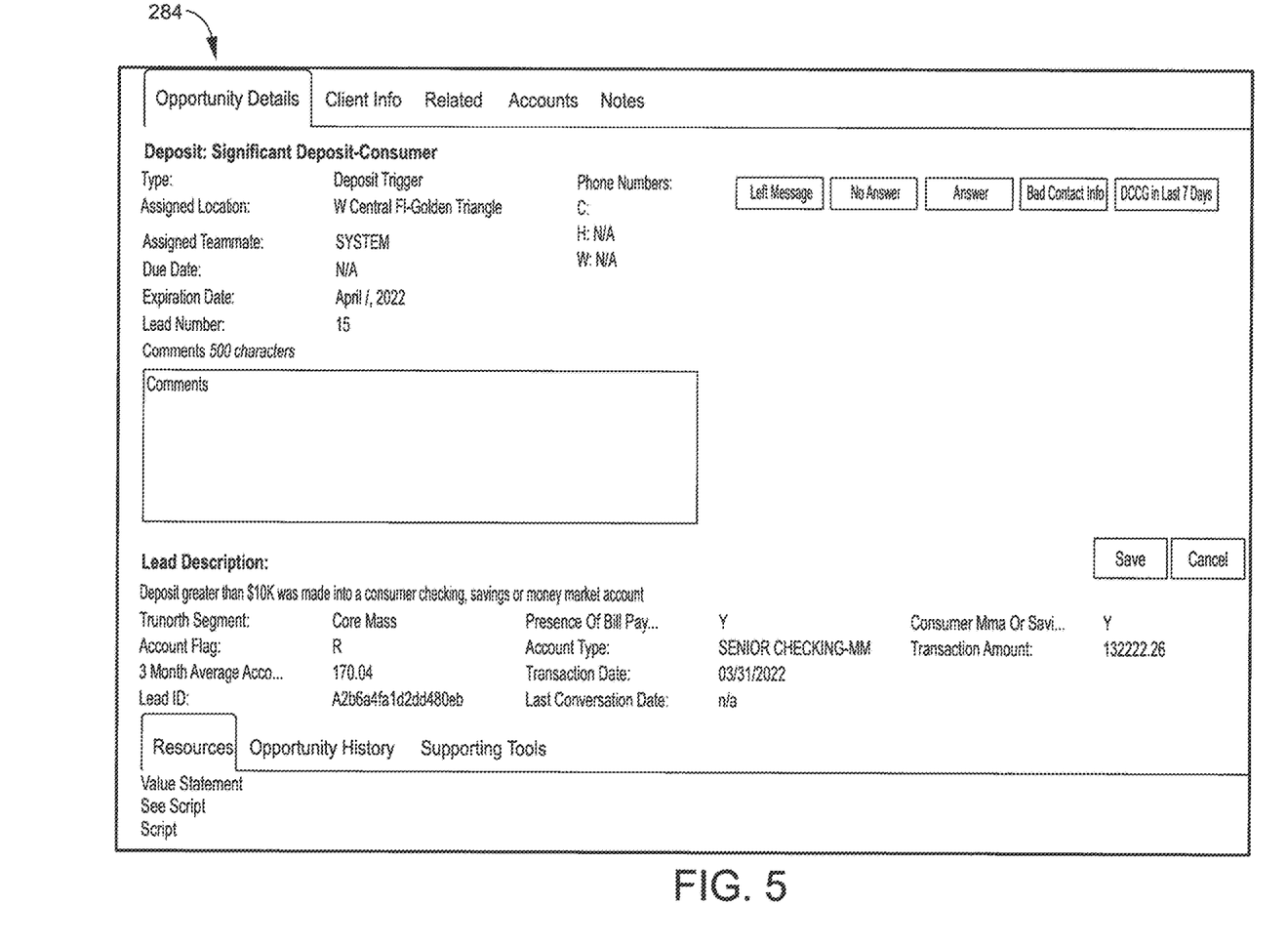
FIG. 5 is a representation of a graphical user interface displaying details of one of the interaction leads provided in the agent dashboard of FIG. 2 and generated by the enterprise system of FIG. 1.

FIG. 4 illustrates an embodiment of a graphical user interface 282 displaying an agent dashboard on the agent device 212 and used by the human agents 210. The human agents 210 may select one of the interaction leads 280 from the graphical user interface 282 to obtain particular details of the selected interaction lead 280. An embodiment of a graphical user interface 284 is shown in FIG. 5, illustrating details of the selected interaction lead 280 provided in the agent dashboard of FIG. 4. The graphical user interface 284 may display general information about the user 110, including but not limited to, products owned, services used, and user behavior. For example, the user information on the graphical user interface 284 may include the primary name and address for the user 110, the "best" phone number based on internal feeds into the database 262 and external matches, the name of the personal banker (if any) of the user 110, a promotional contact history that contains information about prior user contacts in which the user 110 participated in a campaign, and/or details of the activities of the user 110 including the number of checks written, teller transactions, ATM usage, electronic and phone banking services used, payments made with checks from financial competitors, current and historic balances, user net revenue, credit card usage patterns, the branch where the user's primary account is domiciled, the user's preferred branches based on frequency of use, and other products and services used by the user 110.

The graphical user interface 284 may further display general information about the entire household of the user 110. For example, the household information on the graphical user interface 284 may include aggregate financial and product information, specific information about each member of the household, appended external "best guess" demographic information for use in planning sessions, a primary name, address, phone number, and branch for the household as taken from a primary account in the household, and/or all products and services utilized by the household or user 110 including investment services such as brokerage accounts and managed funds, credit services such as bank cards, credit lines, mortgages, secured credit, and business and professional credit products, and other fee-based services such as safe deposit and insurance.

The human agents 210 then conduct sessions (e.g., telephone calls) with each of the users 110 on the list of interaction leads 180. Before and during the sessions, the human agents 210 may use the graphical user interfaces 282, 284 to view a complete profile (in detail or in summary form) of the relationship of the user 110 with the entity and any other demographic information about the user 110 contained on the database 262. This allows the human agents 210 to speak intelligently with the users 110 during the sessions and thereby increase a success rate. As each of the interaction leads 280 is worked by the human agents 210, one or more of the lead dispositions 286 may be assigned. For example, one type of the lead dispositions 286 may be "client contacted by teammate". Accordingly, the lead dispositions 286 may prevent increased opt-out rates and negative experiences of the users 110 resulting from frequent contact within a short timeframe potentially across various distribution channels.

In some embodiments, the application 260 may capture the lead dispositions 286 of each of the interaction leads 280. As discussed herein, the lead dispositions 286 may be captured and stored in the internal files 266 located in the storage device 224 for subsequent use by the application 260. The lead dispositions 286 resulting from the human agents 210 may be captured by the application 260 on a daily basis as each of the interaction leads 280 is worked and closed by the human agents 210. However, the lead dispositions 286 resulting from the automated call center may be captured by the application 260 on a less-frequent basis (i.e. monthly) since those interaction leads 280 are worked in batch. It is understood, however, that the application 260 may capture the lead disposition of each of the interaction leads 280 on any desired basis such as weekly, bi-weekly, and like, for example.

The application 260 may further include a reporting function that displays or prints entity or campaign level reports showing at least the lead dispositions 286. This reporting function may also include lead effectiveness reports. In some embodiments, the lead effectiveness reports provide various measures used to evaluate an effectiveness and efficiency of the application 260 such as actual sales in the household for the users 110 that received at least one lead during a predetermined period of time, sales rate, sales-churn rate, deposit sales increase, incremental deposit amount per contact, loan sales increase, and incremental loan amount per contract, for example. It is understood that the lead effectiveness reports may be generated by the application 260 on any desired bases such as daily, weekly, bi-weekly, monthly, and the like, and/or on-demand, for example. Such reports may also be stored in the internal files 266 located in the storage device 224 of the computing system 206.

The use of the application 260 improves the efficiency of the human agents 210 and operation of the computing system 206 in various different respects. First, the disclosed method provides an ability for the human agents 210 to eliminate unnecessary calculations and communications relating to certain tasks performed by the human agents 210 and/or the computing system 206 that have been found to not have a positive impact on securing the desired product and/or service from the users 110. This may be especially relevant where such campaign materials are to be produced in hard copy form and mailed to the user 110, as extensive costs can be avoided by targeting the correct users 110. This results in the human agents 210 and the computing system 206 avoiding a waste of resources when performing certain tasks, such as sending unnecessary communications of various forms to users 110 that will never interact with or benefit from the sending of such communications. Second, the use of the application 260 also allows for certain variables in the data 234 to be determined to be irrelevant to certain relationships and further allows for the calculations occurring via the computing system 206 to be simplified by means of the elimination of additional variables. Third, the application 260 provides the human agents 210 greater insight to determine other related actions to take that may increase the probability of the completion of a sale or the like with respect to a specific product and/or service, or in improving the preference of the users 110 with respect to a desired account setting. Each of the described advantages reduces network traffic as experienced by the computing system 206 due to the ability to target only those interaction leads 280 that have a greater probability of achieving a positive impact on the engagement with the corresponding users 110.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for improving distributed network data flow efficiency, the system comprising:
   one or more processor; and
   a memory storing computer-readable instructions; wherein execution of the computer-readable instructions by the one or more processor performs steps comprising:
      aggregating data from a plurality of data sources to a standardized format in at least one database, the data including user data of a plurality of users of entity services of an entity and prospective user data of prospective users of the entity services of the entity;
      categorizing, within the at least one database, the data based on a plurality of data attributes;
      querying, based on at least one automatic triggering condition that initiates a query, the at least one database to identify data satisfying one or more query conditions of the query, the at least one automatic triggering condition including a predetermined time of each day with less operational strain on system resources;
      identifying the data satisfying the one or more query conditions of the query and based thereon generating a plurality of active leads for further data processing;
      automatically filtering the plurality of active leads based on one or more predefined selection criteria to obtain one or more filtered leads;
      aggregating the one or more filtered leads with one or more existing stored leads as part of interaction lead list data; and
      applying one or more prioritization standards to the interaction lead list data to identify at least one interaction lead, and based thereon transmitting, via a network connection, the at least one interaction lead to at least one agent device.

2. The system of claim 1, wherein the at least one active lead comprises at least one deposit lead.

3. The system of claim 1, wherein the at least one active lead comprises at least one retention lead.

4. The system of claim 1, wherein the at least one active lead comprises at least one borrowing lead.

5. The system of claim 1, wherein transmission of the at least one interaction lead initiates displaying on an agent dashboard of the at least one agent device the at least one interaction lead.

6. The system of claim 1, wherein the at least one interaction lead is related to a potential target for tendering a product and/or service.

7. The system of claim 1, wherein the at least one interaction lead is related to at least one organized targeting campaign based on the one or more prioritization standards.

8. The system of claim 1, wherein the user data includes at least one of demographic data and transaction history data of at least one user.

9. The system of claim 1, wherein the filtering includes discarding at least one of the plurality of active leads that does not satisfy the one or more predefined selection criteria.

10. The system of claim 1, wherein the one or more existing stored leads include at least one queued lead.

11. The system of claim 1, the steps further comprise applying a predetermined limit for a number of the at least one interaction lead transmitted to the at least one agent device.

12. The system of claim 1, wherein the steps further comprise performing data compression on the interaction lead list data to eliminate data redundancies.

13. A computer-implemented method of improving distributed network data flow efficiency, comprising the steps of:
aggregating data from a plurality of data sources to a standardized format in at least one database, the data including user data of a plurality of users of entity services of an entity and prospective user data of prospective users of the entity services of the entity;
categorizing, within the at least one database, the data based on a plurality of data attributes;
querying, based on at least one automatic triggering condition that initiates a query, the at least one database to identify data satisfying one or more query conditions of the query, the at least one automatic triggering condition including a predetermined time of each day with less operational strain on system resources;
identifying the data satisfying the one or more query conditions of the query and based thereon generating a plurality of active leads for further data processing;
automatically filtering the plurality of active leads based on one or more predefined selection criteria to obtain one or more filtered leads;
aggregating the one or more filtered leads with one or more existing stored leads as part of interaction lead list data; and
applying one or more prioritization standards to the interaction lead list data to identify at least one interaction lead, and based thereon transmitting, via the network connection, the at least one interaction lead to at least one agent device.

14. The method of claim 13, wherein the filtering includes discarding at least one of the plurality of active leads that does not satisfy the one or more predefined selection criteria.

15. The method of claim 13, wherein the one or more existing stored leads include at least one queued lead.

16. The method of claim 13, further comprising the step of applying a predetermined limit for a number of the at least one interaction lead transmitted to the at least one agent device.

17. The method of claim 13, wherein the user data includes at least one of demographic data and transaction history data of at least one user.

18. The method of claim 13, further comprising performing data compression on the interaction lead list data to eliminate data redundancies.

19. A non-transitory computer-readable storage medium, the computer-readable storage medium including instructions that when executed by a processor, cause the processor to:
aggregate data from a plurality of data sources to a standardized format in at least one database, the data including user data of a plurality of users of entity services of an entity and prospective user data of prospective users of the entity services of the entity;
categorize, within the at least one database, the data based on a plurality of data attributes;
query, based on at least one automatic triggering condition that initiates a query, the at least one database to identify data satisfying one or more query conditions of the query, the at least one automatic triggering condition including a predetermined time of each day with less operational strain on system resources;
identify the data satisfying the one or more query conditions of the query and based thereon generating a plurality of active leads for further data processing;
automatically filter the plurality of active leads based on one or more predefined selection criteria to obtain one or more filtered leads;
aggregate the one or more filtered leads with one or more existing stored leads as part of interaction lead list data; and
apply one or more prioritization standards to the interaction lead list data to identify at least one interaction lead, and based thereon transmitting, via a network connection, the at least one interaction lead to at least one agent device.

20. The non-transitory computer-readable storage medium of claim 19, wherein the at least one active lead comprises at least one deposit lead.

* * * * *